(No Model.) 2 Sheets—Sheet 1.
J. A. HUNT.
VELOCIPEDE SADDLE.
No. 489,308. Patented Jan. 3, 1893.
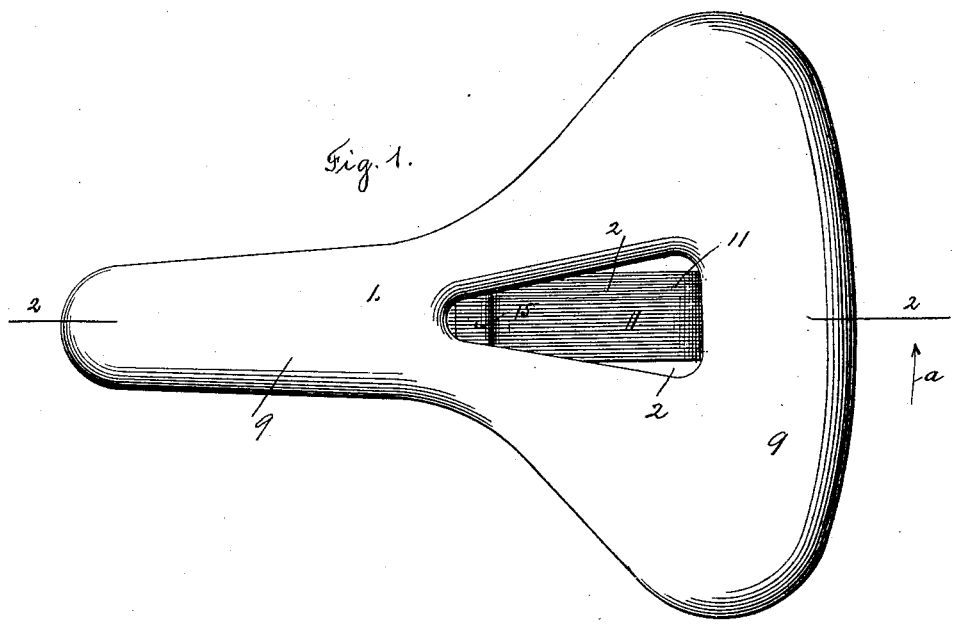
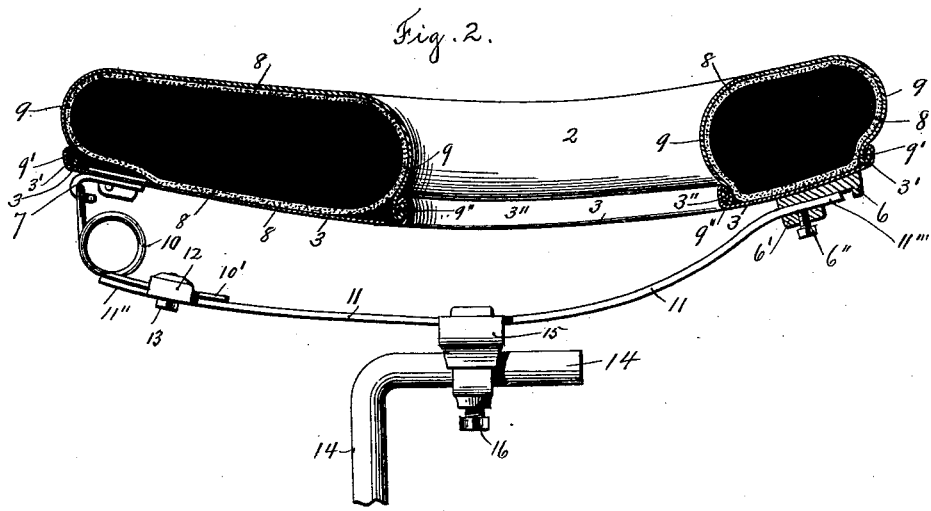
Witnesses
Chas. F. Schmelz
John J. Powers
Inventor
Jonathan A. Hunt,
By his Attorney
John C. Dewey (No Model.) 2 Sheets—Sheet 2.
J. A. HUNT.
VELOCIPEDE SADDLE.
No. 489,308. Patented Jan. 3, 1893.
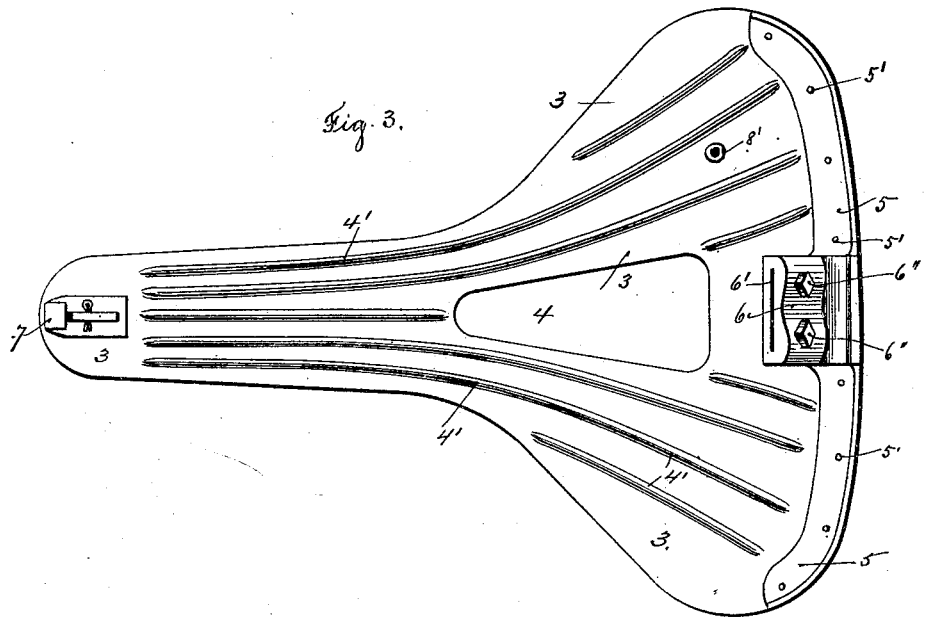
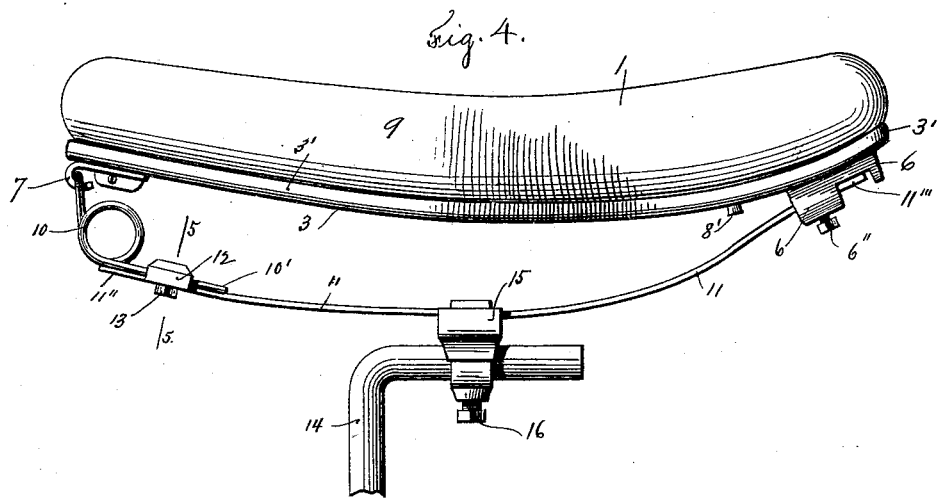
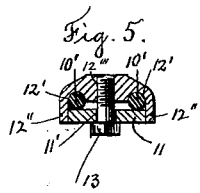
Witnesses  
Inventor  
Jonathan A. Hunt,  
By his Attorney  
John C. Dewey

UNITED STATES PATENT OFFICE.

JONATHAN A. HUNT, OF WESTBOROUGH, MASSACHUSETTS.

VELOCIPEDE-SADDLE.

SPECIFICATION forming part of Letters Patent No. 489,308, dated January 3, 1893.

Application filed April 11, 1892. Serial No. 428,609. (No model.)

*To all whom it may concern:*

Be it known that I, JONATHAN A. HUNT, a citizen of the United States, residing at Westborough, in the county of Worcester and State of Massachusetts, have invented certain new and useful Improvements in Velocipede-Saddles; and I do hereby declare that the following is a full, clear, and exact description thereof, which, in connection with the drawings making a part of this specification, will enable others skilled in the art to which my invention belongs to make and use the same.

My invention relates to saddles for velocipedes, or bicycles, and more particularly to pneumatic saddles, of the class described in the Letters Patent of the United States, No. 471,685, dated March 29, 1892, and the object of my invention is to provide a pneumatic saddle seat in which the leather covering of the rubber bag, or air cushion, may be readily and quickly removed, and replaced, in case it is desired to get at the rubber bag for any purpose.

In the use of the pneumatic saddle described in my said patent, by reason of accidental punctures through the leather covering and the rubber bag by pieces of glass, sharp stones, &c., the rubber bag is liable to leak and allow the air to escape, and in order to get at the rubber bag to remove it, and replace it with a new one, or to repair the leaks thus made, it is necessary to rip out the stitching which unites the upper and lower leather coverings of the rubber bag, and then to stitch the leather coverings together again, after replacing the rubber bag; this operation consumes considerable time, and requires the employment of a machine for sewing the leather, and a skillful attendant to operate it.

In my present invention I use only an upper covering of leather, which extends over the top and sides or edges of the rubber bag, and I do away entirely with the stitching of the leather covering, and provide means for securing said covering in place, so that it can be quickly and readily removed to get at the rubber bag, and then replaced.

My invention also relates to the spring support for the saddle seat, and the object of my invention is to provide a simple and efficient spring support, consisting preferably of a flat metal spring, and a coil wire spring, adjustably clamped together, to be combined with any ordinary saddle seat.

My invention consists in certain novel features of construction of a pneumatic saddle, and a supporting spring, as will be hereinafter fully described, and the nature thereof indicated by the claims.

Referring to the drawings:—Figure 1 is a plan view of a pneumatic saddle, embodying my improvements. Fig. 2 is a central longitudinal section, on line 2 2, Fig. 1, looking in the direction of arrow *a*, Fig. 1, showing the spring support clamped to the saddle support. Fig. 3 is a bottom view of the saddle, with the spring removed. Fig. 4 is a side view of the saddle and spring, looking in the direction of arrow *a*, Fig. 1, and, Fig. 5 is a cross section, on an enlarged scale, on line 5, 5, Fig. 4.

I have shown in the drawings a pneumatic saddle of substantially the same shape as the pneumatic saddle shown in my said patent, and the inflatable rubber bag used in the saddle shown is preferably of the same construction as the rubber bag shown in said patent, and is provided with a valve for inflating the same in the same manner as described in said patent, to which reference is hereby made for a detail description of the same.

In the accompanying drawings, 1 is the saddle proper, or seat, preferably made pear shape, as shown in Fig. 1, and having an opening 2 through the central part thereof for the purpose of ventilation. The saddle 1 has a sheet metal bottom 3, with a central ventilating opening 4 therein; and the bottom 3 is preferably provided with corrugations or ridges 4′ upon its under side, extending lengthwise, as shown in Fig. 3, to strengthen the same. The shape of the bottom 3 conforms to the shape of the finished saddle, but it is larger than the saddle proper, to allow of the outer edges 3′ being turned up and bent over, as shown in Fig. 2.

The rear end of the metal bottom 3 is provided upon its underside with the rib or support 5, made integral therewith, or secured thereto by rivets 5′. The support 5 carries the cantle, or spring holder 6, to which the end of the spring is attached, and which is preferably made integral with the support 5.

The front end of the bottom 3 is provided with a hook 7, to which is attached the spring at the front end of the saddle. The hook 7, shown in the drawings, is of the same construction and operation as the hook shown and described in the Letters Patent of the United States, No. 483,559, dated October 4, 1892, and therefore it is not necessary to describe the same in this application.

Upon the metal bottom 3 rests the inflatable india rubber bag, or air cushion 8, as shown in Fig. 2; said rubber bag is of substantially the same shape and construction as the rubber bag shown in the Patent No. 471,685 above referred to, and is provided with a valve in the same way, the stem of which extends through the bottom 3, as shown at 8', Figs. 3 and 4. The rubber bag 8 has a central ventilating hole through the same, corresponding to the hole 4 in the bottom 3, and the opening 2 in the saddle 1. The covering 9, preferably made of leather, extends over the upper side, and over the edges of the rubber bag 8, and incloses the rubber bag 8 between the metal bottom 3, and said covering 9. The covering 9 has a central ventilating opening therein, corresponding to the opening in the bottom 3 and the opening in the rubber bag 8, and said covering is pressed or molded into the shape desired, and to conform to the general shape of the rubber bag 8, when the same is inflated. After the leather covering 9 has been pressed or molded into the proper shape, and placed over the rubber bag 8, the outer edges 9' of said covering are secured to the outer edges 3' of the metal bottom 3, by bending upwardly and inwardly, the edges 3' of the bottom 3, and binding the outer edges 9' of the leather covering 9 within the folded edges 3' of the bottom 3, thus forming a lap joint and securing the leather covering 9 to the metal bottom 3 all around the outer edge of the saddle. The edges 3'' around the central opening in the metal bottom 3 are also bent upwardly and inwardly, to bind the edges 9'' around the central opening in the leather covering 9, and hold the same firmly in the folded edges 3'' around the central opening of the metal bottom, as clearly shown in Fig. 2, thus forming a lap joint and securing the edges 9'' around the central opening in the leather covering, to the metal bottom, and forming the central opening 2 in the saddle seat.

It will be understood that the leather covering 9 is attached to the metal bottom 3, as above described, after the rubber bag 8 has been placed between them, but before the same has been inflated, and the inflating of the rubber bag 8 will tend to expand the leather covering, and force the outer edges 9' thereof tightly between the turned up edges of the metal bottom 3, and also force the edges 9'' of the leather covering 9 around the central opening in the covering tightly between the turned up edges of the central opening in the metal bottom, see Fig. 2. By this manner of combining the leather covering 9 with the metal bottom 3, and securing the leather covering to the metal bottom, to hold the rubber bag 8 in place, it will be seen, that to remove the leather covering to get at the rubber bag, it is only necessary to bend outwardly the turned over edges of the metal bottom to release the edges of the leather covering, and this operation can be quickly and readily performed by the user of the saddle, with a pair of ordinary pliers. The leather covering is again secured to the metal bottom, by bending or folding over the edges of the metal bottom, as above described. The turned over or folded edges of the metal bottom 3 form a neat beading extending entirely around the lower edge of the saddle, as shown in Fig. 4, and also entirely around the central opening in the saddle, as shown in Fig. 2, and presents a pleasing appearance.

I will now describe the spring shown in the drawings, adapted to be combined with the pneumatic saddle seat above described or with any ordinary saddle seat. The spring consists of a coil spring 10, and a flat spring 11. The coil spring 10 is located at the front end of the saddle, and is of the ordinary shape, and attached to the front end of the saddle by means of the hook 7 in the ordinary way. The rear ends 10' of the coil spring 10 are clamped to the front end of the flat spring 11, preferably in the manner shown in Fig. 5. The spring 11 forms the lower part of the clamp, and a cap piece 12 the upper part. The cap piece 12 has two rounded grooves or depressions 12' in the under surface thereof, to receive the ends 10' of the coil spring 10, and the sides 12'' of the cap piece 12 extend down so as to inclose the edges of the flat spring 11. A bolt or set screw 13 passes loosely through a hole 11' in the spring 11, and screws into a threaded hole 12''' in the cap piece 12. The turning out of the bolt 13 releases the ends 10' of the coil spring 10, and also the end 11'' of the flat spring 11, and allows the springs to be adjusted relatively to each other, and the turning in of the bolt 13 clamps and binds together the ends 10' of the spring 10, and the end 11'' of the spring 11. The rear end 11''' of the spring 11 is secured to the rear end of the saddle, preferably in the manner shown in the drawings.

The cantle or holder 6 is provided with a slot or opening 6' therein, and the bolts or set screws 6'', and the rear end 11''' of the spring 11 extends through the slot 6', and is adjustably held therein by the set screws 6''. By this construction of the cantle 6 I obtain an adjustment between the rear end of the spring 11, and the rear end of the saddle, back of the point where the saddle spring is attached to the saddle support.

The spring 11 is adjustably attached, at about its central point, to the saddle support 14, by a clamp 15, provided with a set screw 16, and of any ordinary construction, but which I prefer to make as shown in the drawings, and as fully described in Letters Patent No. 483,559 before referred to, and to which reference is hereby made for a detail description of the construction of said clamp 15.

It will be understood, that the details of construction of the pneumatic saddle seat and supporting spring shown in the drawings, may be varied some from what is shown and described, if desired.

Instead of the hook 7, for attaching the spring at the front end of the saddle, and the cantle 6 for adjustably attaching the spring at the rear end of the saddle, the ordinary form of hook, and cantle may be used.

Having thus described my invention, what I claim as new and desire to secure by Letters Patent is:

1. In a velocipede saddle, the combination with a sheet metal bottom, provided with a central ventilating opening therein, and longitudinal corrugations or ridges upon its under side, and a hook at one end, and a cantle at the other end, for attaching the supporting spring, and a rubber bag or air cushion supported upon the metal bottom, and having a central ventilating opening therein, of a leather covering extending only over the top and edges of the rubber bag, and the edges of the leather covering secured to the edges of the metal bottom by bending or folding over both edges to form a lap joint, for the purpose stated, substantially as set forth.

2. In a velocipede saddle seat, the combination with a sheet metal bottom, provided with a central ventilating opening therein, and a hook at one end, and a cantle at the other end for attaching the supporting spring, and a rubber bag or air cushion supported upon the metal bottom, and having a central ventilating opening therein, of a leather covering extending only over the top and edges of the rubber bag, with the edges of the leather covering secured to the edges of the metal bottom by bending or folding over both edges to form a lap joint, for the purpose stated, substantially as set forth.

3. In a velocipede saddle seat, the combination with a sheet metal bottom, having a central ventilating opening therein, and provided with a hook and cantle on its under-side, for attaching the supporting spring thereto, and a leather covering forming the top and edges of the saddle seat, and having a ventilating opening therein, and secured to the metal bottom by a lap joint extending around the saddle seat, and around the ventilating opening therein, of a rubber bag or air cushion provided with a ventilating opening, and inclosed between the metal bottom and the leather covering, substantially as shown and described.

4. In a velocipede saddle, the combination with the saddle seat, consisting of a sheet metal bottom provided with a hook at one end, and a cantle at the other end, for attaching the supporting spring, and a leather covering with its edges secured to the metal bottom by a lap joint, and a rubber bag or air cushion inclosed between the leather covering and the metal bottom, and a ventilating opening extending through the saddle seat, of a supporting spring, consisting of a flat metal spring and a coil spring, the flat metal spring adapted to be clamped to the saddle support, with one end secured to the saddle seat, and the other end adjustably clamped to one end of the coil spring, the other end of said coil spring secured to the saddle seat, substantially as shown and described.

5. In a velocipede saddle, the combination with the saddle seat, consisting of a sheet metal bottom, provided with a hook at one end and a cantle at the other end, for attaching the supporting spring, and a leather covering forming the top and edges of the seat, and secured to the metal bottom by a lap joint, and a rubber bag or air cushion inclosed between the leather covering and the metal bottom, and a ventilating opening extending through the saddle seat, of a supporting spring consisting of a flat metal spring, and a coil spring, one end of the flat metal spring attached to the saddle seat, and the other end adjustably clamped to one end of the coil spring, by means of a bolt extending through a hole in the flat spring, with its outer end bearing on the flat spring, and its inner end screwed into a cap piece provided with grooves or depressions into which the ends of the coil spring extend, which are clamped upon the flat spring, and the other end of the coil spring attached to the saddle seat, substantially as shown and described.

6. The combination with a saddle seat, of a spring support, consisting of a flat metal spring, and a coil spring, one end of the flat metal spring attached to the saddle seat, and one end of the coil spring attached to the saddle seat, the other ends of the flat metal spring and coil spring adjustably clamped together by a bolt extending through a hole in the flat metal spring, with its outer end bearing on the lower surface of the flat metal spring, and its inner end screwed into a cap piece provided with grooves or depressions into which the ends of the coil spring extend, and are inclosed within the downwardly extending sides of the cap piece, and clamped between the flat spring and the cap piece, substantially as shown and described.

7. The combination with the saddle seat, having a hook attachment at one end, and a cantle or spring holder at the other end provided with an oblong slot or opening therein, into which one end of the supporting spring extends, and is secured by one or more set screws, of a spring support, consisting of a flat metal spring, and a coil spring, one end of the flat metal spring and one end of the coil spring attached to the saddle seat, and the other ends of the flat metal spring and the coil spring adjustably clamped together by means of a bolt extending through a hole in the flat metal spring, and a cap piece provided with grooves into which the ends of the coil spring extend, said cap piece secured to the flat metal spring, to clamp the coil spring and flat metal spring together, by said bolt, substantially as shown and described.

8. In a saddle spring, the combination with a coil spring, and a flat spring, of a clamp for adjustably securing together the flat spring and the coil spring, the flat spring forming the lower part of the clamp, and a cap piece provided with grooves or depressions into which the ends of the coil spring extend, forming the upper part of the clamp, and a screw extending loosely through a hole in the flat spring, and screwed into the cap piece to clamp the flat spring and the ends of coil spring together, substantially as shown and described.

JONATHAN A. HUNT.

Witnesses:
KATIE FARRELL,
JOHN C. DEWEY.